US009003123B2

(12) United States Patent
Waugh et al.

(10) Patent No.: US 9,003,123 B2
(45) Date of Patent: Apr. 7, 2015

(54) DATA PROCESSING APPARATUS AND METHOD FOR REDUCING STORAGE REQUIREMENTS FOR TEMPORARY STORAGE OF DATA

(75) Inventors: Alex James Waugh, Cambridge (GB); Matthew Lee Winrow, Cambridge (GB)

(73) Assignee: ARM Limited, Cambridge (GB)

( * ) Notice: Subject to any disclaimer, the term of this patent is extended or adjusted under 35 U.S.C. 154(b) by 171 days.

(21) Appl. No.: 13/532,904

(22) Filed: Jun. 26, 2012

(65) Prior Publication Data

US 2013/0346698 A1 Dec. 26, 2013

(51) Int. Cl.

| | |
|---|---|
| ***G06F 12/00*** | (2006.01) |
| ***G06F 13/00*** | (2006.01) |
| ***G06F 13/28*** | (2006.01) |
| ***G06F 12/08*** | (2006.01) |
| *G06F 9/45* | (2006.01) |

(52) U.S. Cl.

CPC .......... *G06F 12/0862* (2013.01); *G06F 8/4442* (2013.01)

(58) Field of Classification Search

CPC . G06F 8/4442; G06F 9/30047; G06F 9/3802; G06F 9/3816; G06F 11/1064; G06F 12/0862

USPC ............. 711/3, 100, 113, 118, 125, 137, 144, 711/133, 135, 136; 712/200–219, 300

See application file for complete search history.

(56) References Cited

U.S. PATENT DOCUMENTS

| | | | | |
|---|---|---|---|---|
| 5,835,949 | A * | 11/1998 | Quattromani et al. | 711/135 |
| 2003/0009631 | A1 * | 1/2003 | Arimilli et al. | 711/135 |
| 2006/0265551 | A1 * | 11/2006 | Grandou et al. | 711/128 |

* cited by examiner

*Primary Examiner* — Yaima Rigol
*Assistant Examiner* — Shane Woolwine
(74) *Attorney, Agent, or Firm* — Nixon & Vanderhye P.C.

(57) ABSTRACT

An instruction cache stores cacheable instructions for access by a processing circuitry, the instruction cache having a data storage comprising a plurality of cache lines and a tag storage comprising a plurality of tag entries, each cache line for storing instruction data specifying a plurality of cacheable instructions, and each tag entry for storing an address identifier for the instruction data stored in an associated cache line. The instruction cache including valid flag storage for identifying whether each cache line is valid. Instruction cache control circuitry is arranged to store within a selected cache line of the data storage the instruction data for a plurality of cacheable instructions as retrieved from memory, to store within the tag entry associated with that selected cache line the address identifier for that stored instruction data, and to identify that selected cache line as valid within the valid flag storage.

25 Claims, 8 Drawing Sheets

DATA PROCESSING APPARATUS AND METHOD FOR REDUCING STORAGE REQUIREMENTS FOR TEMPORARY STORAGE OF DATA

BACKGROUND OF THE INVENTION

1. Field of the Invention

The present invention relates to techniques for reducing storage requirements within a data processing apparatus for temporary storage of data.

2. Description of the Prior Art

A data processing apparatus will typically include processing circuitry for executing a sequence of instructions, each instruction being specified by instruction data stored in memory. Often, an instruction cache will be provided in association with the processing circuitry for temporary storage of instruction data that has been retrieved from memory, in order to provide quick access to that instruction data when required by the processing circuitry. By use of such an instruction cache, this can reduce the time taken to process requests from the processing circuitry for instructions, since if the instruction data specifying those instructions already resides within the instruction cache, that instruction data can be provided directly to the processing circuitry without needing to access memory. However, in the event of a cache miss (i.e. where the requested instruction data does not reside within the instruction cache), then it is necessary to initiate a transaction to memory in order to retrieve the required instruction data, this incurring a significant delay due to the latency associated with memory transactions.

Typically an entire cache line's worth of instruction data (including that specifying the instruction of interest) is retrieved when processing such a transaction, with that cache line's worth of instruction data then being stored within the cache. Due to the predominantly sequential nature of instruction execution, such an approach is often beneficial, since there is a high likelihood that subsequent requests from the processing circuitry will then relate to instructions specified by instruction data already residing within that cache line. This hence reduces the number of cache misses and hence the number of stalls incurred whilst waiting for instructions to be returned from memory.

Often, prefetch circuitry is provided within the processing circuitry for issuing requests for instructions in anticipation of them being required for execution by the processing circuitry. This helps to hide the memory latency from the processing circuitry, by seeking to maintain a steady stream of instructions ready for execution by the processing circuitry.

The address space of the memory will often contain cacheable address regions and non-cacheable address regions. Instructions that reside in cacheable address regions are often referred to as cacheable instructions, whilst instructions that reside within non-cacheable address regions are often referred to as non-cacheable instructions. The instruction data specifying cacheable instructions can be stored in the instruction cache since it can be used again in the future. However, this does not apply to instruction data specifying non-cacheable instructions, which is required to be re-fetched from memory if needed again. In particular, for non-cacheable instructions, a cache lookup operation performed within the instruction cache must not generate a cache hit.

In order to get similar performance benefits for pre-fetched non-cacheable instruction code as is available when using an instruction cache to store pre-fetched cacheable instruction code, processors often employ temporary storage buffers for storing instruction data specifying such pre-fetched non-cacheable instructions. However, such buffers are costly in terms of silicon area.

One known approach for providing such buffers is to seek to re-use buffering that already exists for cacheable instructions. In particular, it is common to provide a linefill buffer in which the instruction data relating to a cache line's worth of cacheable instructions can be collated prior to being written into the instruction cache, thereby reducing the number of write operations required in respect of the instruction cache by ensuring that an entire cache line is written in one operation. Such linefill buffers can also be used for the temporary storage of instruction data specifying non-cacheable instructions, but clearly whilst a linefill buffer is used to temporarily store instruction data for non-cacheable instructions, it is not available to be used to collate instruction data for a cache line's worth of cacheable instructions ahead of that cacheable instruction data being written into the instruction cache. Accordingly this can lead to a proliferation in the number of linefill buffers in order to ensure that there will always be at least one linefill buffer available for collating instruction data for cacheable instructions. Such buffers are costly in terms of silicon area, and as the number of instructions that can be prefetched increases, this increases the number of buffers required.

Another option for reducing the silicon area requirements is to limit the amount of instruction code that can be prefetched in advance. This saves some area, but increases the likelihood of stalling the processor due to an inability to prefetch the instruction in advance.

It would hence be desirable to provide an improved mechanism for buffering the instruction data of non-cacheable instructions.

SUMMARY OF THE INVENTION

Viewed from a first aspect, the present invention provides a data processing apparatus comprising: processing circuitry configured to execute a sequence of instructions, each instruction having an associated memory address and said sequence of instructions including cacheable instructions whose associated memory addresses are within a cacheable memory region; an instruction cache configured to store cacheable instructions for access by the processing circuitry, said instruction cache having a data storage comprising a plurality of cache lines and a tag storage comprising a plurality of tag entries, each cache line configured to store instruction data specifying a plurality of cacheable instructions, and each tag entry configured to store an address identifier for the instruction data stored in an associated cache line, the instruction cache further comprising valid flag storage configured to identify for each cache line whether that cache line is valid; instruction cache control circuitry configured to store within a selected cache line of the data storage the instruction data for a plurality of cacheable instructions as retrieved from memory, to store within the tag entry associated with that selected cache line the address identifier for that stored instruction data, and to identify that selected cache line as valid within the valid flag storage; the instruction cache control circuitry further being configured to receive data of a predetermined data type, said predetermined data type not being instruction data for a plurality of cacheable instructions; the instruction cache control circuitry being responsive to receipt of said data of a predetermined data type to store said data in a chosen cache line of the data storage of the instruction cache, but to identify the chosen cache line as invalid within the valid flag storage; and the instruction cache control circuitry further comprising control state circuitry configured to maintain a record of the chosen cache line in which said data of a predetermined data type has been written, and upon receipt of a request for that data to provide that data from the instruction cache.

Typically, the data of said predetermined data type will be data that is of a relatively transitory interest to the processing circuitry, and hence is unlikely to require to be buffered for a long period of time. As a result, the temporary retention of this data within the instruction cache is unlikely to have any significant performance impact on the operation of the instruction cache. Further, since any cache line containing such data will be marked as invalid, it cannot be the subject of a cache hit when a cache lookup operation is performed, and hence does not inhibit the correct operation of the instruction cache when a lookup operation is performed in order to look for the presence within the instruction cache of instruction data of a requested cacheable instruction.

Whilst the data of said predetermined data type can take a variety of forms, the approach of the present invention is particularly well-suited to situations where the data of the predetermined data type is instruction data for non-cacheable instructions. In particular, the inventors realised that instruction data for non-cacheable instructions is relatively rare, often limited to bootup (where caches are often disabled by default) and, rarely, small sections of code that have been explicitly marked as non-cacheable. Adding additional buffer storage for such infrequent non-cacheable code is therefore costly. Further, the inventors realised that the provision of such extra buffer storage was not necessary, since there is already storage available in the form of the instruction cache. Often when non-cacheable code is required by the processing circuitry, such as in the bootup scenario envisaged above, the instruction cache may not be being used for its normal purpose, and accordingly temporary buffering of non-cacheable instruction data within the data storage of the instruction cache has no detrimental effect on the operation of the instruction cache. More generally, due to the relatively rare nature of non-cacheable instruction code, and the fact that it will only need to be retained for a relatively short period of time, such non-cacheable instruction data can be accommodated within the instruction cache without any significant impact on the performance of the instruction cache.

Further, such instruction data for non-cacheable instructions can be retrieved from memory over the same communication path as instruction data for cacheable instructions, and hence the instruction cache control circuitry can readily be configured to store such instruction data for non-cacheable instructions within the data storage of the instruction cache. However, to ensure that such instruction data will not be found during a cache lookup operation performed in respect of the instruction cache, any cache line containing such non-cacheable instruction data is marked as invalid. In addition, the instruction cache control circuitry provides control state circuitry to maintain a record of any cache line in which such non-cacheable instruction data has been written, so as to enable that data to be retrieved from the instruction cache if requested by the processing circuitry.

The requirement for non-cacheable instructions to be re-fetched from memory if needed again can readily be accommodated, since once the processing circuitry starts to request instructions from a different cache line to the cache line containing instruction data for non-cacheable instructions, or a branch takes place to a non-sequential instruction address, the associated record can be discarded, for example by marking that record as inactive. Thereafter, if instruction data for a non-cacheable instruction that had been stored in the cache line referenced by that discarded record is subsequently requested, it will be re-fetched from memory.

In one embodiment, the instruction cache control circuitry includes a buffer configured to temporarily buffer data received by the instruction cache control circuitry prior to storage of that data in the data storage of the instruction cache. This same buffer can be used to temporarily buffer instruction data for cacheable instructions prior to that instruction data being written into the instruction cache, and also to temporarily buffer the data of said predetermined data type prior to it being stored in the data storage of the instruction cache.

In one embodiment, the data processing apparatus further comprises an interface to memory via which the instruction data is received, the interface having a bus width via which a block of instruction data specifying at least one instruction is received, and said buffer has a size sufficient to accommodate at least one block of instruction data. Both instruction data relating to cacheable instructions and instruction data relating to non-cacheable instructions can be received via this interface.

The bus width of the interface will vary dependent on implementation, but in one embodiment the bus width is less than the width of each cache line within the data storage of the instruction cache, and accordingly multiple blocks of instruction data will be retrieved via the interface in order to form a cache line's worth of instruction data.

The size of the buffer can be varied dependent on implementation. For example, in one embodiment, the buffer may have the same size as a typical linefill buffer used to hold an entire cache line's worth of instruction data prior to that instruction data being written into the instruction cache. However, in one embodiment, the buffer has a size sufficient to accommodate one block of instruction data. Whilst this then requires each block of instruction data to be written into the cache as it is received, it provides significantly enhanced flexibility, since it allows multiple pending requests for data from memory to be outstanding, and allows individual blocks of instruction data relating to those different pending requests to be received in any order by the buffer.

In one embodiment, the instruction cache control circuitry is responsive to receipt of a request from the processing circuitry specifying an address for a requested instruction, to determine with reference to the specified address whether the instruction data for the requested instruction is present within the data storage of the instruction cache or within said buffer, and if so to return the instruction data for the requested instruction to the processing circuitry. Furthermore, in one embodiment, if the instruction cache control circuitry determines that the instruction data for the requested instruction is not present within the data storage of the instruction cache or within said buffer, the instruction cache control circuitry is configured to initiate a transaction to memory to retrieve from memory a series of blocks of instruction data sufficient to fill a cache line in the data storage of the instruction cache, said series of blocks of instruction data including the instruction data for the instruction requested by the processing circuitry, and each block of instruction data being temporarily buffered in the buffer prior to storage in the data storage of the instruction cache.

In one such embodiment, the control state circuitry comprises a plurality of buffer control state entries, each buffer control state entry having an active flag which when set indicates that that buffer control state entry is active, the control state circuitry being configured to maintain an active buffer control state entry in association with each outstanding transaction where at least one block of instruction data is still awaited from the memory. Through the use of multiple buffer control state entries, there may be multiple outstanding transactions at any point in time, with those transactions sharing the buffer.

In one embodiment where the data of a predetermined data type is instruction data for non-cacheable instructions, the data processing apparatus is arranged such that, for a transaction relating to instruction data for cacheable instructions, the control state circuitry is configured to clear the active flag of the associated buffer control state entry once all of the blocks of instruction data for that transaction have been stored in the data storage of the instruction cache, the presence of a cleared active flag indicating that the associated buffer control state entry is inactive and available for allocation to a subsequent transaction. However, for a transaction relating to instruction data for non-cacheable instructions, the control state circuitry is configured to retain the active flag of the associated buffer control state entry in its set state until receipt of a control signal indicating that the associated blocks of instruction data are no longer required, the associated buffer control state entry providing the record of the chosen cache line in which said blocks of instruction data have been written in order to allow those blocks of instruction data to be accessed by the instruction cache control circuitry. Hence, the buffer control state entry for a transaction relating to non-cacheable instructions may remain active even after all of the blocks of instruction data for that transaction have been retrieved from memory, and stored within the data storage of the instruction cache, allowing the buffer control state entry to be referenced in order to identify the presence of that instruction data within the instruction cache, and allow that instruction data to be retrieved.

There are a number of ways in which the control state circuitry may determine that the instruction data of non-cacheable instructions is no longer required. For example, in one embodiment, the control state circuitry is responsive to a signal indicating that a current request from the processing circuitry for a requested instruction has crossed a cache line boundary with respect to the immediately preceding request from the processing circuitry for a requested instruction, to determine that each active buffer control state entry for a transaction relating to instruction data for non-cacheable instructions is no longer required, and to hence clear the active flag of any such active buffer control state entry once the associated transaction has completed (i.e. the last block of instruction data has been received from the memory).

Alternatively, or in addition, the control state circuitry may be responsive to a signal indicating that a current request from the processing circuitry specifies a non-sequential address with respect to the address specified by the immediately preceding request from the processing circuitry, to determine that each active buffer control state entry for a transaction relating to instruction data for non-cacheable instructions is no longer required, and to hence clear the active flag of any such active buffer control state entry once the associated transaction has completed. By such an approach, it can be ensured that any non-cacheable instruction data temporarily buffered within the data storage of the instruction cache will not be reused following a branch in instruction flow, or a sequential transition across a cache line boundary.

In one embodiment, each buffer control state entry maintains state data for each block of instruction data of the associated transaction, that state data identifying whether the associated block of instruction data is awaited from memory, is in the buffer, or has been written to the data store of the instruction cache. This state data is used both when the associated transaction relates to cacheable instructions and when the associated transaction relates to non-cacheable instructions, and allows the instruction cache control circuitry to determine how to respond to a request for instruction data from the processing circuitry.

In one embodiment, each buffer control state entry maintains location data identifying a target cache line within the data storage of the instruction cache that is to store the series of blocks of instruction data of the associated transaction. The form of this location data will depend on the structure of the instruction cache. In one particular embodiment, the instruction cache is an n-way set associative cache, and the location data comprises address data identifying a set within the instruction cache and a way identifier identifying the way within that identified set that contains the target cache line.

In one embodiment, the buffer is shared amongst all of the buffer control state entries, each buffer control state entry maintains a transaction identifier of the associated transaction, each block of instruction data temporarily buffered in the buffer has its transaction identifier provided in association therewith, and the control state circuitry is configured to use the transaction identifier provided in association with a currently buffered block of instruction data to determine which buffer control state entry should be used to manage how that block of instruction data is stored in the data storage of the instruction cache. The use of such a transaction identifier provides a simple and effective mechanism for associating blocks of instruction data received in the buffer with the associated buffer control state entry.

In one embodiment, the buffer is configured to temporarily buffer a single block of instruction data at a time, with that block of instruction data being stored to the data storage of the instruction cache before a next block of instruction data is input to the buffer.

In one embodiment, the control state circuitry's maintenance of an active buffer control state entry in association with each outstanding transaction allows the control state circuitry to handle individual blocks of instruction data amongst the series of blocks of instruction data of a single transaction being input to the buffer out of order. Further, it allows the control state circuitry to handle individual blocks of instruction data of multiple pending transactions being input to the buffer in an interleaved manner.

In one embodiment, the processing circuitry comprises prefetch circuitry configured to prefetch instructions in anticipation of those instructions being required for execution by the processing circuitry, the prefetch circuitry being configured to issue said request specifying an address for a requested instruction. In one such embodiment, each buffer control state entry maintains an abandoned flag, and when the abandoned flag is set in one of the buffer control state entries, the instruction cache control circuitry is configured to modify its handling of each subsequent block of instruction data temporarily buffered in the buffer relating to the associated transaction.

In particular, in one embodiment, when the abandoned flag is set in one of the buffer control state entries, the instruction cache control circuitry causes each subsequent block of instruction data temporarily buffered in the buffer relating to the associated transaction to be discarded rather than written into the data storage of the instruction cache.

The scenarios which cause the abandoned flag to be set may be chosen dependent on implementation. However, in one embodiment, the abandoned flag is set in any active buffer control state entry for a transaction relating to instruction data for non-cacheable instructions, upon receipt of a signal from the processing circuitry indicating that the processing circuitry will not be executing the instructions being prefetched by the prefetch circuitry. This is a safe course of action for non-cacheable instructions, since it is known that they will not be used by the processing circuitry (or in any case will need re-fetching from memory), and it is safe to discard any remaining blocks of instruction data since any blocks written into the instruction cache already are within a cache line marked as invalid, and hence that cache line's current contents will not be accessed during any subsequent cache lookup operation.

However, in one embodiment, the same action is not taken for an active buffer control state entry for a transaction relating to cacheable instructions, since it is possible that those cacheable instructions may still be useful to the processing circuitry at some future point, and by not setting the abandoned flag this ensures that the transaction is completed, and the entire cache line written.

Viewed from a second aspect, the present invention provides a method of operating a data processing apparatus having processing circuitry for executing a sequence of instructions, each instruction having an associated memory address and said sequence of instructions including cacheable instructions whose associated memory addresses are within a cacheable memory region, the data processing apparatus further having an instruction cache for storing cacheable instructions for access by the processing circuitry, said instruction cache having a data storage comprising a plurality of cache lines and a tag storage comprising a plurality of tag entries, each cache line storing instruction data specifying a plurality of cacheable instructions, and each tag entry storing an address identifier for the instruction data stored in an associated cache line, the instruction cache further comprising valid flag storage for identifying for each cache line whether that cache line is valid, the method comprising: storing within a selected cache line of the data storage the instruction data for a plurality of cacheable instructions as retrieved from memory, storing within the tag entry associated with that selected cache line the address identifier for that stored instruction data, and identifying that selected cache line as valid within the valid flag storage; receiving data of a predetermined data type, said predetermined data type not being instruction data for a plurality of cacheable instructions; in response to receipt of said data of a predetermined data type, storing said data in a chosen cache line of the data storage of the instruction cache, but identifying the chosen cache line as invalid within the valid flag storage; and maintaining a record of the chosen cache line in which said data of a predetermined data type has been written, and upon receipt of a request for that data, providing that data from the instruction cache.

Viewed from a third aspect, the present invention provides a data processing apparatus comprising: processing means for executing a sequence of instructions, each instruction having an associated memory address and said sequence of instructions including cacheable instructions whose associated memory addresses are within a cacheable memory region; an instruction cache means for storing cacheable instructions for access by the processing means, said instruction cache means having a data storage means comprising a plurality of cache lines and a tag storage means comprising a plurality of tag entries, each cache line for storing instruction data specifying a plurality of cacheable instructions, and each tag entry for storing an address identifier for the instruction data stored in an associated cache line, the instruction cache means further comprising valid flag storage means for identifying for each cache line whether that cache line is valid; instruction cache control means for storing within a selected cache line of the data storage means the instruction data for a plurality of cacheable instructions as retrieved from memory means, for storing within the tag entry associated with that selected cache line the address identifier for that stored instruction data, and for identifying that selected cache line as valid within the valid flag storage means; the instruction cache control means further for receiving data of a predetermined data type, said predetermined data type not being instruction data for a plurality of cacheable instructions; the instruction cache control means, responsive to receipt of said data of a predetermined data type, for storing said data in a chosen cache line of the data storage means of the instruction cache means, but for identifying the chosen cache line as invalid within the valid flag storage means; and the instruction cache control means further comprising control state means for maintaining a record of the chosen cache line in which said data of a predetermined data type has been written and, upon receipt of a request for that data, for providing that data from the instruction cache means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
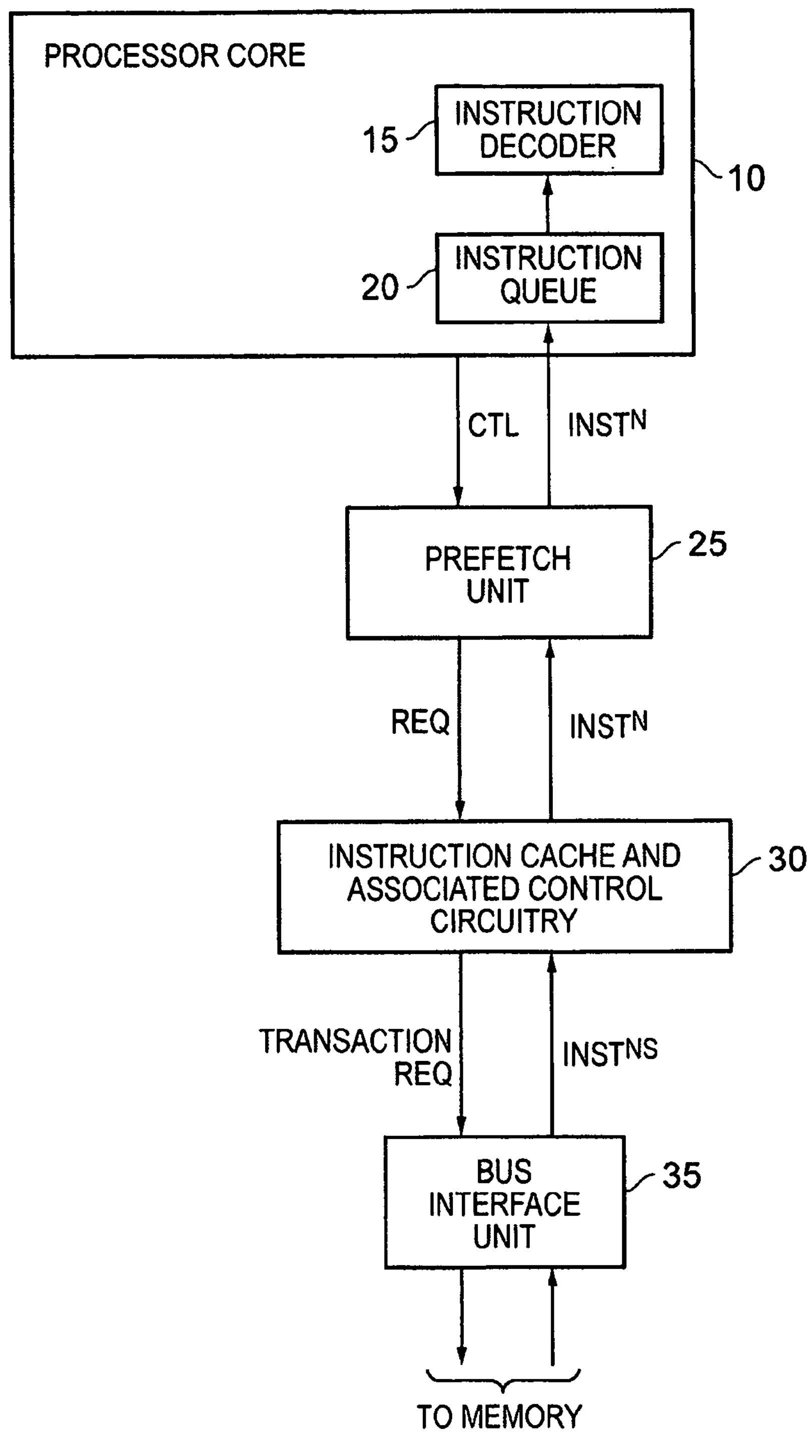
FIG. 1 is a block diagram of a data processing apparatus in accordance with one embodiment.

FIG. 1 is a block diagram of a data processing apparatus in accordance with one embodiment. The processor core 10 includes an instruction decoder 15 for decoding instructions retrieved from an instruction queue 20, in order to issue control signals to the appropriate processing circuits within the processor core to cause those instructions to be executed. In the embodiment shown in FIG. 1, a prefetch unit 25 is provided for outputting to the instruction cache and associated control circuitry 30 requests for instructions in anticipation of them being required for execution by the processor core 10. This helps to hide the memory latency from the processor core 10, by seeking to maintain a steady stream of instructions into the instruction queue 20 ready for execution by the processor core 10. The prefetch unit 25 will receive various control signals from the processor core that it uses in order to determine which instructions to prefetch. As will be understood by those skilled in the art, certain prediction techniques can be used by the prefetch unit 25, such as branch prediction mechanisms to predict the target address of branch instructions, and hence predict the instructions required by the processor core 10. If the actual flow of instruction execution within the processor core differs from that predicted by the prefetch unit, a control signal can be issued from the processor core to the prefetch unit 25 to cause the prefetch unit to flush any currently prefetched instructions and begin prefetching from a new target address. As the operation of prefetch units such as the prefetch unit 25 will be well understood by those skilled in the art, the operation of the prefetch unit will not be discussed further herein.

Whilst the prefetch unit 25 is shown in FIG. 1, the use of the prefetch unit is not essential, and in alternative embodiments the processor core 10 may directly issue requests for instructions to the instruction cache and associated control circuitry 30.

The address space of memory will contain cacheable address regions and non-cacheable address regions. Instructions that reside in cacheable address regions will be referred to herein as cacheable instructions, whilst instructions that reside in non-cacheable address regions will be referred to as non-cacheable instructions. An instruction cache such as the instruction cache within block 30 is used to store cacheable instructions retrieved from memory via the bus interface unit 35, such that if those cacheable instructions are the subject of a request from the prefetch unit 25, the instructions can be directly returned to the prefetch unit from the instruction cache.

However, non-cacheable instructions are required to be re-fetched from memory each time they are required by the processor core 10, and accordingly prior to the present invention the storage capabilities of the instruction cache have not been utilised for non-cacheable instructions.

If on receipt of a request for an instruction from the prefetch unit 25, the control circuitry associated with the instruction cache determines that the request relates to a cacheable address region, it will perform a cache lookup within the instruction cache in order to determine whether the required instruction data specifying that instruction resides within the instruction cache. If it does, the instruction data is returned directly from block 30 to the prefetch unit 25. However, if it does not reside in the cache, then a transaction will typically be initiated via the bus interface unit 35 in order to retrieve a cache line's worth of instruction data from memory, that cache line's worth of instruction data including the instruction data for the requested instruction from the prefetch unit. When the instruction data for that transaction is returned from memory via the bus interface unit 35 to the instruction cache and associated control circuitry 30, it is written into a selected cache line within the instruction cache, and in addition the instruction data requested by the prefetch unit is returned to the prefetch unit.

Due to the typically sequential nature of instruction execution, it is highly likely that one or more subsequent requests from the prefetch unit will then relate to instructions that now reside within the instruction cache due to an entire cache line's worth of instruction data having been retrieved from memory, and accordingly those subsequent requests are likely to give rise to a cache hit, whereby the instruction data can be returned directly to the prefetch unit without needing to initiate a further transaction to memory.

In order to seek to achieve similar benefits for non-cacheable instructions, it has hitherto been necessary to provide temporary buffer storage, so that when a transaction is issued to memory to retrieve the instruction data for a series of non-cacheable instructions, that instruction data can be buffered locally when returned from memory, such that if subsequent requests from the prefetch unit request other sequential non-cacheable instructions that have now been buffered, those instructions can be returned to the prefetch unit without needing to issue another transaction to memory.

As will be discussed in more detail with reference to the subsequent figures, in accordance with embodiments of the present invention, the inventors have developed a technique which allows the storage capabilities of the instruction cache to be used to store such non-cacheable instruction data, thereby avoiding the need for costly buffer storage. Further, the technique ensures that such non-cacheable instruction data will not result in a cache hit when a cache lookup operation is performed within the instruction cache, thus ensuring that the presence of the non-cacheable instruction data does not compromise the correct operation of the instruction cache. Further, the technique ensures that the instruction data for non-cacheable instructions is only temporarily retained, and in particular if the instructions being prefetched cross a cache line boundary, or a request for a non-sequential instruction address is issued (such as may occur when a branch instruction is encountered), the non-cacheable instruction data held within the instruction cache is effectively discarded, ensuring that if it is subsequently requested, it will be re-fetched from memory.

Figure 2:
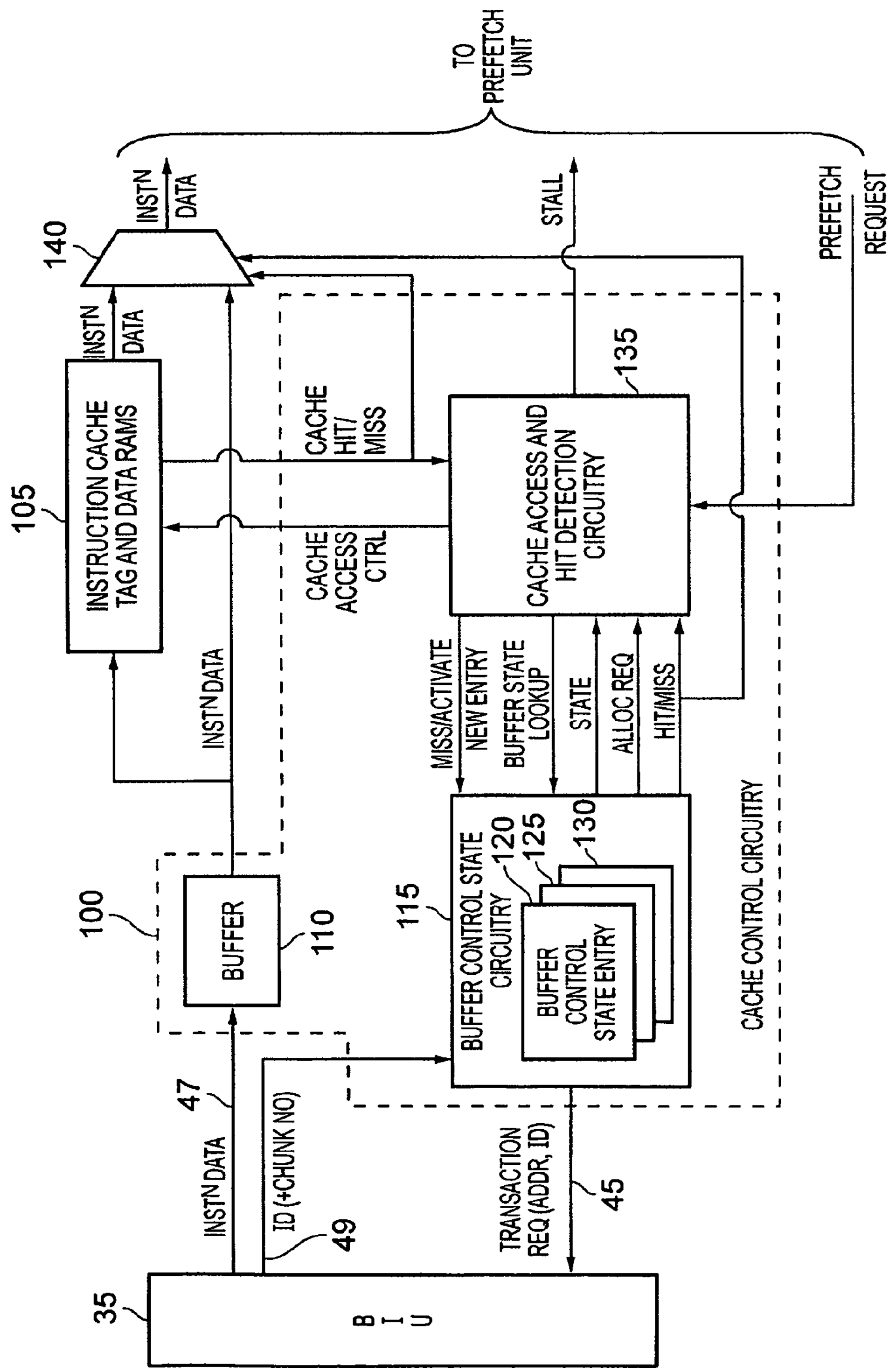
FIG. 2 is a block diagram illustrating in more detail the components provided within the instruction cache and associated control circuitry of FIG. 1 in accordance with one embodiment.

FIG. 2 is a block diagram illustrating in more detail the instruction cache and associated control circuitry 30 of FIG. 1. The instruction cache 105 includes tag and data storage, referred to herein as tag and data RAMs, since both the tag storage and the data storage is in one embodiment formed by Random Access Memory.

Figure 7:
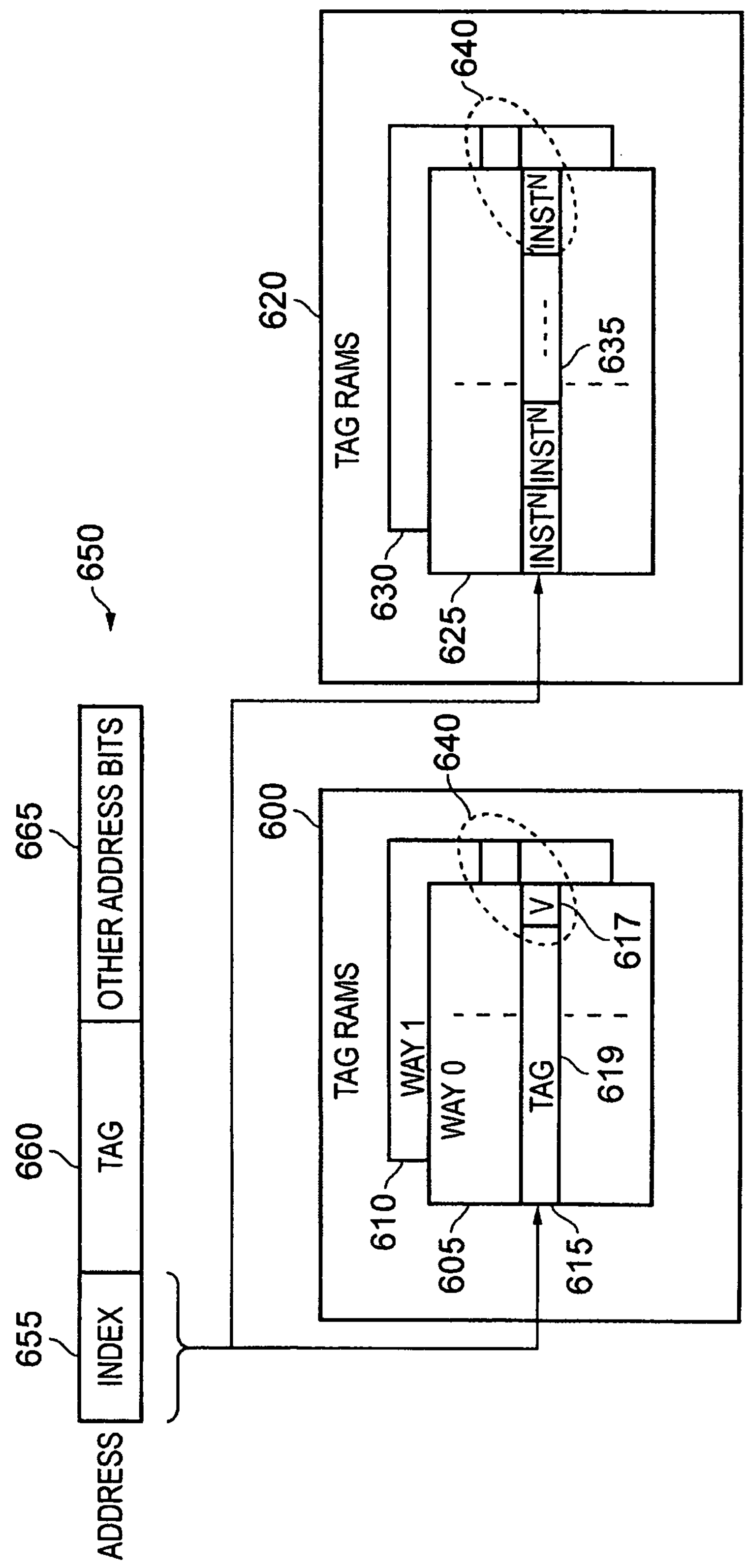
FIG. 7 is a block diagram schematically illustrating the tag RAMs and data RAMs of the instruction cache in accordance with one embodiment.

FIG. 7 schematically illustrates the structure of these tag and data RAMs in accordance with one embodiment. In particular, in this example the instruction cache is a two-way set associative cache. Accordingly, the data RAMs block 620 includes two data RAMs 625, 630, each data RAM including a series of cache lines 635. Similarly, the tag RAMs block 600 includes two tag RAMs 605, 610, one for each way. Further, each cache line within one of the data RAMs 625, 630 has a corresponding tag entry 615 within the corresponding tag RAM 605, 610.

Each request from the prefetch unit will identify an address 650, and for an address in a cacheable address region an index portion 655 of that address will be used during a cache lookup operation to identify a particular set 640 within the cache, the set 640 including a cache line 635 from each data RAM 625, 630 and the corresponding tag entries 615 from the associated tag RAMs 605, 610. Each tag entry includes a valid bit 617 which is set to identify that the corresponding cache line 635 is valid, and is cleared to identify that the corresponding cache line is not valid. In one embodiment, a set state is indicated by a logic one value of the valid bit 617, and a clear state is indicated by a logic zero value of the valid bit 617, but it will be appreciated that the meaning of these bit values can be reversed in alternative embodiments. For any tag entries whose valid bit 617 is set in the identified cache set 640, a tag portion 660 of the address is compared with a tag value 619 held in the identified entry, and in the event of a match this indicates a cache hit. If the tag values do not match in any of the valid tag entries of the set, then this indicates a cache miss. In the event of a cache hit, the contents of the associated cache line 635 are output, and the other address bits 665 of the address 650 are used to identify the particular instruction of interest within that cache line 635.

The cache control circuitry 100 controls the operation of the instruction cache 105, and the retrieval of instruction data from memory via the bus interface unit 35 as and when required. The cache control circuitry 100 includes cache access and hit detection circuitry 135 arranged to receive each prefetch request issued by the prefetch unit 25. The cache access and hit detection circuitry then uses the information provided in the prefetch request, including the specified address, to identify whether the instruction data for the requested instruction is present within the instruction cache 105. For a specified address, the cache access and hit detection circuitry 135 will issue a buffer state lookup request to the buffer control state circuitry 115, to cause the buffer control state circuitry 115 to perform a lookup in respect of each buffer control state entry 120, 125, 130 in order to determine whether the instruction being requested is currently being managed by a buffer control state entry.

In addition, if the specified address is within a cacheable memory address range, the cache access and hit detection circuitry 135 will perform a standard cache look up operation as described earlier with reference to FIG. 7 in order to determine with reference to the tag RAMs 605, 610 whether there is a cache hit, and if so to cause the required instruction data to be output from the instruction cache 105 to the multiplexer 140, from where it will typically be routed back to the prefetch unit. In one embodiment this cache lookup operation is performed in parallel with the buffer state lookup.

If the specified address is in a non-cacheable address range, the cache access and hit detection circuitry 135 will not perform a cache lookup operation. However, in one embodiment the cache access and hit detection circuitry 135 still accesses the data RAMs using the specified address such that if there is a hit in one of the buffer control state entries, and that entry identifies that the requested instruction data is already in the cache, the way information specified in that buffer control state entry can be used to identify which data RAM's contents should be returned as the requested instruction data. As with the cache lookup operation for a cacheable address, in one embodiment this access to the data RAMs for a non-cacheable address can be performed in parallel with the buffer state lookup.

Whilst the cache access and hit detection circuitry 135 will typically use the address specified by the prefetch request in order to determine whether the request relates to a cacheable instruction or a non-cacheable instruction, one or more other attributes provided with the prefetch request may also be used for that purpose. For example, a memory management unit or memory protection unit provided in association with the processor core 10 and the prefetch unit 25 may add other state bits to the prefetch request, identifying whether caches are enabled, etc, and those state bits can be used in combination with the address in order to decide whether the request relates to a cacheable instruction (hence requiring a cache lookup in the instruction cache 105) or relates to a non-cacheable instruction (hence requiring only the data RAMs of the instruction cache to be accessed).

Figure 3:
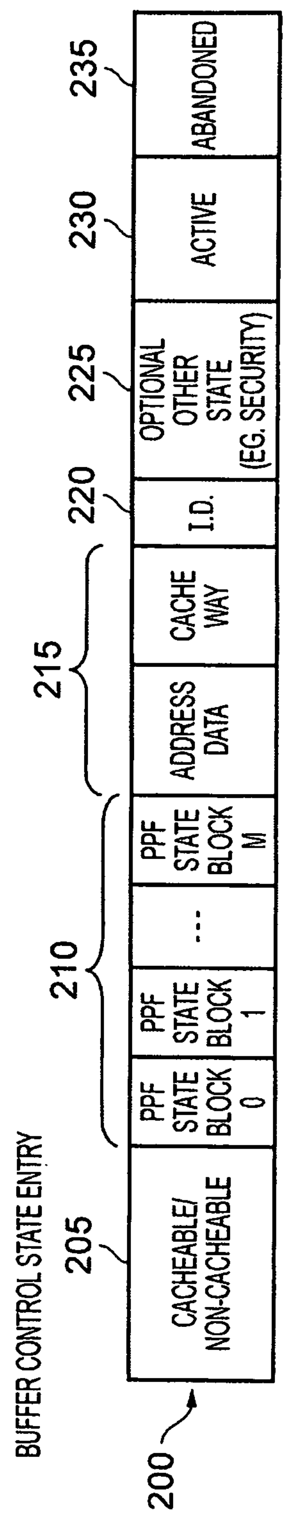
FIG. 3 illustrates the fields provided within each buffer control state entry of FIG. 2 in accordance with one embodiment.

In one embodiment, each buffer control state entry 120, 125, 130 takes the form of the buffer control state entry shown in FIG. 3. In particular, each buffer control state entry includes an active flag 230 which is set to indicate that the entry is active, and is cleared to indicate that the entry is not active. During the buffer state lookup, only active entries will be considered. Each active entry will include a cacheable/non-cacheable flag 205 whose value will identify whether the instructions relating to that entry are cacheable instructions or non-cacheable instructions.

An active entry is maintained for each transaction request issued over path 45 from the cache control circuitry 100, such a transaction request being issued if the instruction data requested by the prefetch request is not available within either the instruction cache 105 or the buffer 110 within the cache control circuitry 100, and accordingly needs to be retrieved from memory. However, rather than issuing a transaction request merely to retrieve the instruction data specifically requested, in one embodiment the transaction request will request an entire line's worth of instruction data, typically this being returned as multiple blocks of instruction data over the path 47 from the BIU 35, the size of each block being dependent on the bus width available at the BIU 35.

For each block of instruction data to be returned for the associated transaction, a separate state field is maintained within the buffer control state entry 200, so that typically there will be a series of state fields 210 within each buffer control state entry. Each state field identifies the instruction data location of the associated block, and in particular whether that block of data is still awaited from memory, is currently stored within the buffer 110, or has been stored within the instruction cache 105. In one embodiment, these different options are referred to as the past, present and future states, a past state indicating that the associated block of instruction data has been received via the buffer and stored into the instruction cache 105, the present state indicating that the data is currently in the buffer 110, and the future state indicating that the instruction data is still awaited from memory. Accordingly, herein the state field will be referred to as the PPF (Past, Present, Future) state field, but more generally it will be appreciated that this state field can be referred to as the data location state field.

Each buffer control state entry also includes a cache location data field 215 identifying which cache line within the cache the data is to be stored at. In particular, whenever it is decided to issue a transaction request over path 45 to the BIU 35, a victim cache line selection process will be performed in order to determine a victim cache line whose current contents are to be overwritten by the instruction data to be returned over path 47 from memory. From the earlier discussion of FIG. 7, it will be appreciated that the memory address, and in particular the index portion 655 of that memory address 650, will identify a particular set within the instruction cache, but for an n-way set associative cache this will not in itself identify the exact cache line. Accordingly, in the embodiment illustrated in FIG. 3, the address data is stored in combination with a cache way indication in order to collectively specify location data for the cache line within the instruction cache that is to be used to store the associated instruction data.

Each transaction request issued over path 45 will also include a transaction identifier, and this transaction identifier will be unique for each pending transaction. This transaction identifier is stored within the transaction identifier field 220 of the buffer control state entry 200, for use in tracking the instruction data returned to the buffer 110. In particular, as each block of instruction data is returned over path 47 to the buffer 110, the associated transaction ID will be provided as a side band signal over path 49, and can be routed to the buffer control state circuitry 115 to allow the buffer control state circuitry to determine which of the buffer control state entries 120, 125, 130 is managing that instruction data. The contents of that buffer control state entry can then be used to determine how to manage the instruction data presently stored in the buffer 110. This process will be discussed in more detail later with reference to FIGS. 5A and 5B.

The buffer control state entry 200 may also include one or more additional fields 225 providing optional other state that may be relevant to the transaction. Hence, for example, certain security data may be associated with the transaction, and that data can be captured within the fields 225. This security data can be used in combination with the other relevant data (such as the address data of the location data 215) in order to detect whether there is a hit in one of the buffer control state entries. By factoring the security data into this check, it can for example be ensured that non-secure code will not hit on a buffer control state entry relating to secure code.

In one embodiment, each buffer control state entry 200 also includes an abandoned flag 235, which when set causes any subsequent data blocks relating to the transaction and returned to the buffer 110 to then be discarded rather than written into the instruction cache 105. This will be discussed in more detail later with reference to FIG. 6.

As discussed earlier, if the cache access and hit detection circuitry 135 determines that the specified address provided with the prefetch request relates to a non-cacheable address region, a buffer state lookup is performed in respect of the buffer control state circuitry 115 in order to determine whether there are any active buffer control state entries relating to a transaction request issued in respect of non-cacheable instructions, and if so the address data held as part of the cache location data 215 can be used in order to determine whether the specific non-cacheable instruction identified by the specified address from the prefetch unit is within the range of instructions that are the subject of that transaction request. If there is such a buffer control state entry, then the state stored within that buffer control state entry is returned to the cache access and hit detection circuitry 135 along with a hit/miss signal which in that instance is set to indicate that a hit has been found within a buffer control state entry.

The cache access and hit detection circuitry 135 will then use the returned state in order to decide what action to take. In particular, using the specified address, the cache address and hit detection circuitry 135 can determine within which block of instruction data the instruction data for the requested instruction resides. Purely by way of example, if each cache line contains the instruction data for sixteen instructions, and each block of instruction data routed back over path 47 contains the instruction data for four instructions (this being dictated by the bus interface width available to the BIU 35), then it will be appreciated that there will be four PPF state fields 210 within the buffer control state entry. The address data provided as part of the cache line location data 215 will identify the first instruction data in the sequence, and by comparing that address data with the specified address it can be determined where in the sequence the requested instruction data will reside. The relevant PPF state block can then be reviewed in order to determine where the block of instruction data including the requested instruction data resides, in particular whether it is still awaited from memory, whether it currently resides within the buffer 110, or whether it resides within the instruction cache 105. If it is still awaited from memory, then the cache access and hit detection circuitry 135 will issue a stall signal back to the prefetch unit, to cause the prefetch unit to continue to assert the prefetch request. If it is determined from the relevant PPF state field that the instruction data required is within the buffer 110, then that instruction data is routed from the buffer to the multiplexer 140, from where it is returned to the prefetch unit under the control of the hit/miss signal issued from the buffer control state circuitry 115. Whilst not explicitly shown in FIG. 2, the specified address from the prefetch unit can be used to determine which item of instruction data (or items of instruction data if the prefetch unit reads more than one instruction at a time) is output from the buffer 110 for returning to the prefetch unit.

If instead it is determined that the instruction data required has already been stored within the instruction cache, then the cache access and hit detection circuitry 135 is arranged to use the location data 215 in order to access the required data RAM of the instruction cache and retrieve the required instruction data, which is then routed via the multiplexer 140 back to the prefetch unit. As mentioned earlier, in one embodiment, all of the data RAMs (e.g. two data RAMS for the two-way set associative example of FIG. 7) are actually accessed in parallel with the lookup performed in respect of the buffer control state entries. Hence, in such embodiments there is no need to access the data RAMs again at this point, and instead if it is determined that the instruction data required has already been stored within the instruction cache, the location data can be used merely to identify which of the instruction data retrieved from the data RAMs holds the required instruction data, with that required instruction data then being routed back to the prefetch unit.

Whilst the above buffer state lookup process has been described in relation to a prefetch request issued in respect of a non-cacheable instruction, it will be appreciated that the buffer state lookup is also useful for cacheable instructions. In particular, the buffer state lookup will identify whether there is currently an active buffer control state entry in relation to a transaction request issued for instruction data including the requested item of instruction data, and in the event that there is, the state data returned to the cache access and hit detection circuitry 135 can be used to determine whether the data is still awaited from memory, whether it resides within the buffer 110, or whether it has already been written to the cache. This data hence provides a useful qualifier on any hit condition arising from the cache lookup operation, allowing the valid bit to be set in a tag RAM entry when the first block of instruction data is written in the associated cache line without having to wait for the entire cache line to be updated. In particular, if there is a cache hit from the lookup operation, but also a hit in a buffer control state entry, it is only safe to use the cache line contents from the cache if the state data returned from the buffer control state entry indicates that the relevant instruction data has already been written in the cache. Obviously, if there is no hit in a buffer control state entry, it is also then safe to use the cache line contents in the event of a cache lookup hit.

Since in the above described embodiment the cache control circuitry causes a line of cache data to be written to the cache data RAM in several blocks, it is necessary to ensure that as soon as a new line of data starts to be written to any given cache line, any old data that was present in that cache line (i.e. data that is now being evicted) no longer hits, because that old data is no longer valid.

One way to do this would be to clear the valid bit in the associated tag RAM entry and then, once the final block of the new data has been stored into the cache line, update the tag RAM entry for the new cache line including setting the valid bit. However, such an approach involves two operations to the tag RAM: one to invalidate and one to validate. Each operation consumes power.

Instead, the above described implementation writes the new tag information when the first block of new data is written to the cache line, including setting the valid bit. The evicted data will no longer hit because the tag information has been updated, but the new cache line will hit even though not all blocks of data have been written to that cache line. However, by arranging the cache control circuitry such that the buffer control state entry hit takes precedence over the cache hit, consistency of the operation is maintained. A benefit of this approach is that there is no longer a need to do the invalidate operation on the tag RAM entry, thereby saving power.

If as a result of the above processes, it is determined that the requested instruction data does not reside within the instruction cache 105 or the buffer 110, and is not the subject of a pending transaction request where the relevant instruction data is still awaited from memory, then the cache access and hit detection circuitry 135 will issue a miss signal to the buffer control state circuitry 115, also referred to herein as an activate new entry signal. Upon receipt of such an activate new entry signal, the buffer control state circuitry 115 will look for an available buffer control state entry that can be used to track the transaction request that is required to be issued, and once such an available buffer control state entry has been located, that entry will be set to active, the abandon flag will be cleared, and all of the other fields will have their values set appropriately. Initially, all of the PPF state blocks will be set to future, to indicate that the data is awaited from memory. At this point, a transaction request 45 will be issued to the BIU 35 to request a cache line's worth of instruction data including the instruction data of interest.

As each block of instruction data is returned to the buffer 110, the associated ID signal on path 49 is used to identify the buffer control state entry that is responsible for that block of instruction data. Assuming the abandoned flag has not been set in that entry, then an allocation request is issued to the cache access and hit detection circuitry 135 to cause the instruction data in the buffer 110 to be stored within the cache in the cache line indicated by the cache location data 215 within the buffer control state entry. For cacheable instruction data, this will involve the tag RAMs being accessed in addition to the data RAMs in order to set the appropriate tag value in the relevant tag entry, and also to set the valid flag to identify that the associated cache line is valid. Such an update to the tag RAM entry will occur at least once (for example the first time) when instruction data for that cache line is written into the cache line during the processing of a transaction.

However, if the transaction relates to non-cacheable instructions, then the location data 215 will be used to write the required blocks of instruction data into the relevant cache line within the data RAM, but the corresponding tag entry will merely have its valid flag cleared. As a result, any such non-cacheable instruction data written into the data RAMs will effectively be "invisible" to any cache lookup operation performed, since such a cache lookup operation will only consider cache lines whose associated valid bit is set. However, the data can still be retrieved from the cache whilst the associated buffer control state entry is retained in its active state, since the location data 215 will provide the cache access and hit detection circuitry 135 with enough information to enable it to access the required cache line within the data RAM and retrieve the non-cacheable instruction data.

Figure 4:
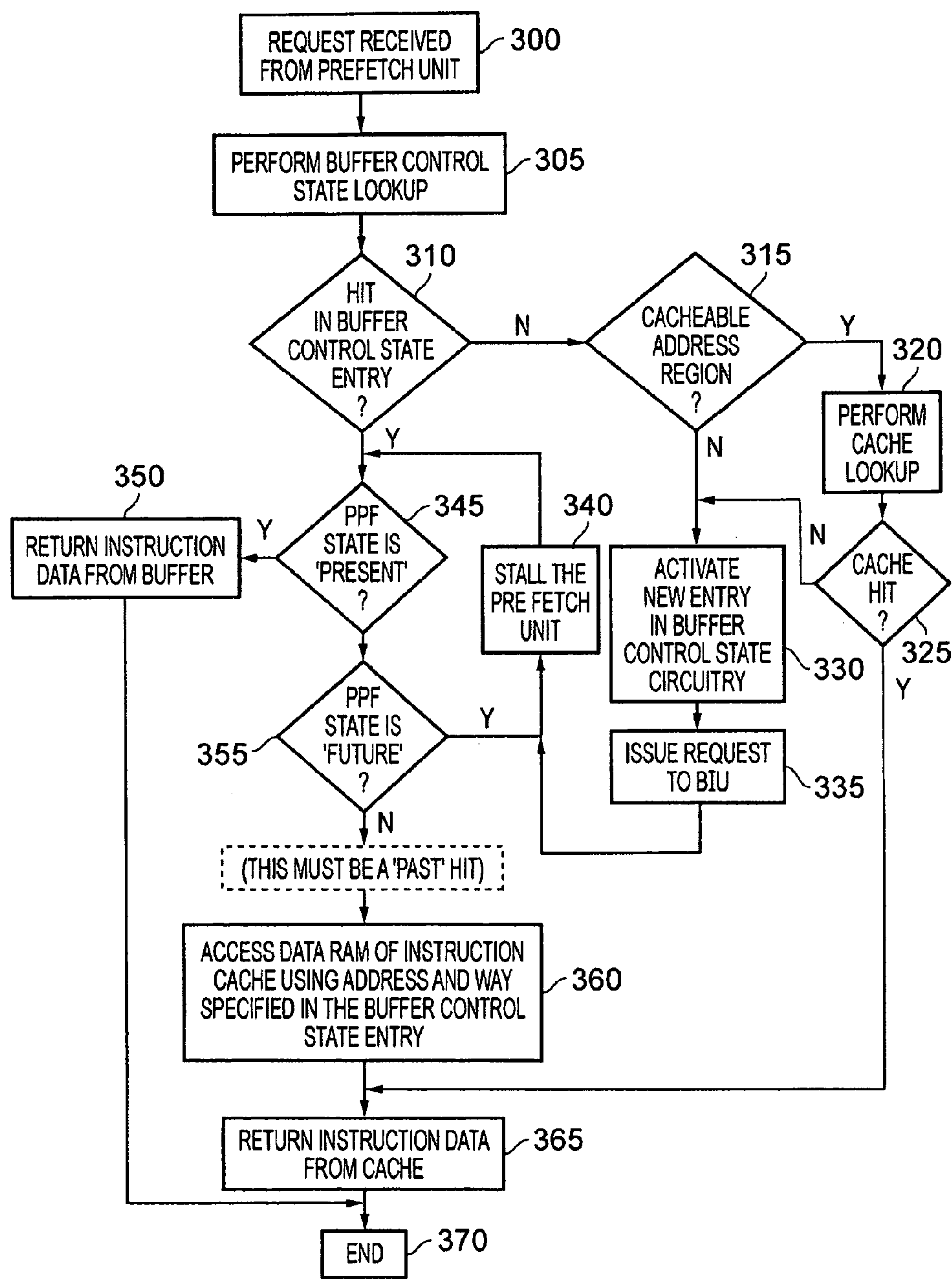
FIG. 4 is a flow diagram illustrating how the cache control circuitry of FIG. 2 handles a request from the prefetch unit in accordance with one embodiment.

FIG. 4 is a flow diagram detailing the steps performed by the instruction cache and associated cache control circuitry of FIG. 2 in accordance with one embodiment, upon receipt of a request from the prefetch unit. The request is received at step 300, whereafter at step 305 a buffer control state lookup is performed. When performing the buffer state lookup at step 305, in one embodiment it will only be possible to obtain a hit in one of the buffer control state entries if that entry is active and not abandoned.

At step 310, it is then determined whether there is a hit in any of the buffer control state entries as a result of the lookup performed at step 305. If there is a hit in one of the buffer control state entries, then the process proceeds to step 345 where it is determined whether the PPF state for the block of instruction data including the requested instruction data is set to "present", i.e. whether that data is currently stored in the buffer 110. If so, at step 350 the instruction data is returned to the prefetch unit directly from the buffer 110, whereafter the process ends at step 370.

If it is determined at step 345 that the PPF state is not set to "present", then it is determined at step 355 whether the PPF state for the block of instruction data including the requested instruction data is set to "future", i.e. whether that data is awaited from memory. If not, this means that the PPF state must be set to "past", i.e. the instruction data required is already stored in the cache, and accordingly the process proceeds to step 360, where the cache access and hit detection circuitry 135 accesses the relevant data RAM of the instruction cache using the location data 215 specified in the hit buffer control state entry. Thereafter, the instruction data that has been accessed from the cache is returned at step 365 to the prefetch unit, whereafter the process ends at step 370.

As mentioned earlier, in one embodiment the cache can be accessed in parallel with the buffer control state lookup performed at step 305 if desired, in order to reduce latency in the event that the required data does reside in the cache. In particular, for a request for non-cacheable instruction data, all of the data RAMs can be accessed in parallel with the buffer control state lookup at step 305 if desired, to read the instruction data found at the specified address within each way. Then at step 360 all that is required is to use the way information within the location data to select which of the read instruction data is the required instruction data, before then returning that instruction data to the prefetch unit at step 365. Similarly, for a request for cacheable instruction data, the cache lookup (using the tag RAMs and the data RAMs) can be performed in parallel with the buffer control state lookup at step 305 if desired, such that if step 360 is reached, it is known that the hit instruction data from the cache can be used, and hence can be returned to the prefetch unit at step 365.

If at step 355 it is determined that the PPF state for the block of instruction data including the requested instruction data is set to "future", then a stall signal is issued to the prefetch unit at step 340, and the process returns to step 345.

If at step 310 it is determined that there was not a hit in any buffer control state entry, the process proceeds to step 315, where it is determined whether the request relates to a cacheable address region (in fact in one embodiment this can be determined as soon as the request is received at step 300, based on the attributes associated with that request). If so, a cache lookup is performed at step 320 by the cache access and hit detection circuitry 135. Based on the cache lookup, it is then determined at step 325 whether there has been a cache hit. If so, the required instruction data is merely returned at step 365 from the instruction cache to the prefetch unit, whereafter the process ends at step 370. As mentioned earlier, this cache lookup at step 320 can actually in one embodiment be performed in parallel with the buffer control state lookup at step 305 if desired, so that in the event of there being a cache hit, the required instruction data is already available to be returned at step 365.

However, if it is determined at step 315 that there is not a cache hit, then the process branches to step 330, where a new entry is activated in the buffer control state circuitry, whereafter a transaction request is issued to the BIU at step 335.

Following step 335, the process proceeds to step 340, where a stall signal is issued to the prefetch unit, and the process returns to step 345. Initially, the relevant PPF state will be set to future, but at some point that state will transition to present, indicating that the contents are in the buffer 110. At that point, the process can branch to step 350 to cause the data to be returned from the instruction buffer, whereafter the process will end at step 370.

Figure 5A:
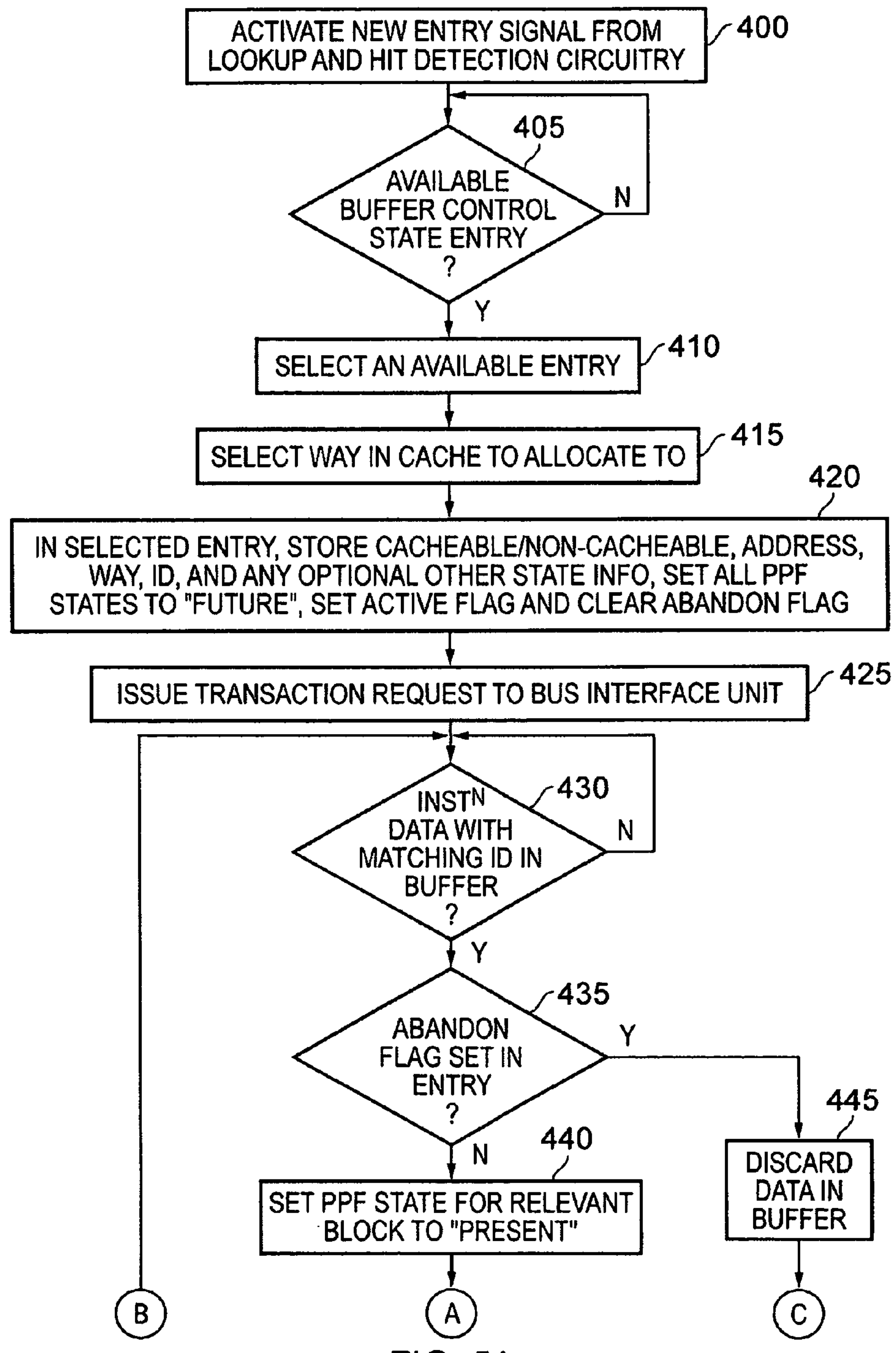
FIGS. 5A and 5B provide a flow diagram illustrating the operation of the cache control circuitry when it is necessary to issue a transaction request to memory.
Figure 5B:
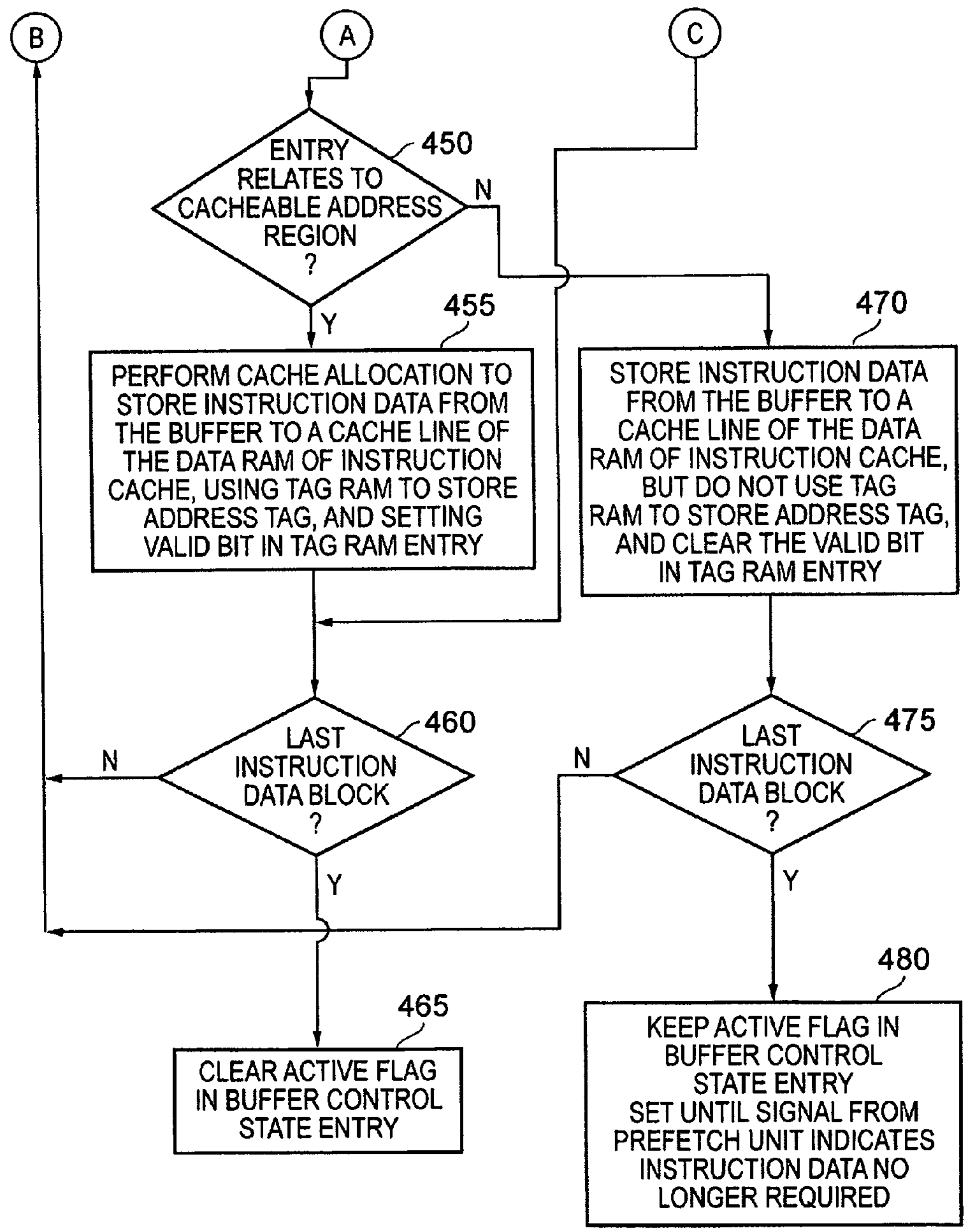

FIGS. 5A and 5B are a flow diagram illustrating the steps performed in response to a new entry being activated within the buffer control state circuitry, as discussed earlier this arising in a situation where the cache control circuitry determines that the instruction data of interest is not the subject of a current pending transaction request and is not in the instruction cache. At step 400, an activate new entry signal is received by the buffer control state circuitry 115 from the cache access and hit detection circuitry 135. At step 405, it is determined whether there is an available buffer control state entry, and if not the process stalls at step 405 until there is an available buffer control state entry. Thereafter, at step 410 an inactive entry is selected. In one particular embodiment, as discussed earlier with reference to FIG. 7, the instruction cache is a two-way set associative cache. Accordingly at any point in time there can only be two active buffer control state entries (that are not abandoned) that are writing to the same set of cache lines (the set comprising one cache line from each of the two ways). A buffer control state entry will be available if it is inactive and there are not already two other active buffer control state entries referring to the same set of cache lines. In practice, in such an embodiment, it has been found that by providing three buffer control state entries 120, 125, 130, it will typically be the case that there will be an available buffer control state entry when step 405 is reached.

Following selection of an inactive entry at step 410, then at step 415 a way within the cache is selected in order to allocate the instruction data to in due course. There are a number of known ways for selecting victim cache lines within a cache, and hence selecting which way the data is going to be allocated into, and accordingly those techniques will not be described in detail herein. However, typically, if there is an invalid cache line within the relevant set, that invalid cache line will be chosen as the victim cache line.

At step 420, various data is stored within the selected buffer control state entry. In particular, the flag 205 is set to identify whether the associated transaction relates to cacheable instructions or non-cacheable instructions, the address data and cache way data forming the location field 215 are completed, a transaction ID associated with the transaction is identified within the field 220 and any optional other state data is stored within the field 225. Further, all of the PPF states 210 are initially set to "future", the active flag is set in the field 230, and the abandon flag is cleared within the field 235.

At step 425, a transaction request is issued to the BIU 35, specifying a transaction address (i.e. the address of the first instruction data to be retrieved), and also specifying various other signals, such as the transaction ID. Depending on the embodiment, the length of the transaction may also be specified in the request, whilst in alternative embodiments the length of the transaction will be predetermined (the length indicating the number of blocks of instruction data to be retrieved from memory, starting with the address contained within the transaction request issued over path 45).

At step 430, it is determined whether there is instruction data with a matching ID present in the buffer 110. If not, no action is taken in respect of the relevant buffer control state entry. However, whenever instruction data with a matching ID does appear in the buffer, then it is determined at step 435 whether the abandon flag is set within the buffer control state entry. If it is, then the data in the buffer is discarded at step 445, whereas if the abandon flag is not set, then the PPF state for the relevant block is set to "present" within the buffer control state entry at step 440. If the blocks of instruction data are constrained to be returned "in order" for a particular transaction, the relevant PPF state field will be self evident. However, if the blocks of instruction data are allowed to be returned "out of order" for a particular transaction, then a sideband signal can be returned with each block of instruction data from memory identifying the particular block being returned, and this can be used to identify the relevant PPF state field.

Following step 440, the process proceeds to step 450, where it is determined whether the buffer control state entry relates to a cacheable address region. If it does, then a cache allocation process is performed at step 455 to store the instruction data from the buffer to the relevant cache line of the data RAM of the instruction cache, with the tag RAM being used to store an address tag, and with the valid bit being set in the tag RAM entry. Whilst in FIG. 7 the valid bits are provided directly within the tag RAMs, in an alternative embodiment a separate valid bit storage can be provided in which to store the valid data for the various cache lines.

Whilst the tag RAM and valid bits may be updated each time a block of instruction data is written to the associated cache line, in one embodiment the tag RAM entry is only updated once, for example when the first block of instruction data is written to the cache line, or alternatively when the last block of instruction data is written to the cache line.

Following step 455, it is determined at step 460 whether the last instruction data block of the transaction has been processed. Following step 445 of FIG. 5A, the process would proceed directly to step 460.

If it is determined that the last instruction data block of the transaction has not yet been processed, then the process returns to step 430, whereas if the last block has been reached, the process proceeds to step 465, where the active flag is cleared in the associated buffer control state entry, hence releasing that buffer control state entry for use in association with a subsequent transaction.

If at step 450, it is determined that the entry relates to a non-cacheable address region, then the process proceeds to step 470, where the instruction data is stored from the buffer to a cache line of the data RAM of the instruction cache using the address data and cache way information stored in the buffer control state entry. However, the tag RAM entry is not used to store an address tag value, and the valid bit in the associated tag RAM entry is cleared. As a result, any such instruction data stored in the data RAM of the instruction cache will not be accessible using a standard cache lookup operation. However, it can still be accessed for as long as the associated buffer control state entry remains active, given the cache location data 215 residing within that buffer control state entry.

At step 475, it is then determined whether the last instruction data block has been processed, and if not the process returns to step 430. However, once the last instruction data block has been processed, the process proceeds to step 480, where the active flag in the associated buffer control state entry is retained in the set state until such time as a signal from the prefetch unit has been received indicating that the instruction data is no longer required. By this mechanism, it can be ensured that the instruction data can be retrieved from the cache if appropriate.

However, due to the nature of non-cacheable instructions, they cannot indefinitely be held within the instruction cache, since as soon as a branch instruction causes a change in instruction flow to take place, or sequential instruction flow crosses a cache line boundary, any subsequent request for that non-cacheable instruction data will need to be processed with reference to memory, and it would not be appropriate to obtain the data directly from the instruction cache.

Accordingly, whenever the cache control circuitry receives a signal from the prefetch unit indicating a request for an instruction that resides in a different cache line to the last sequential instruction requested, or indicating that a branch (i.e. a jump to a non-sequential instruction address) has taken place, this will cause the buffer control state circuitry 115 to deactivate each buffer control state entry relating to non-cacheable instructions once the associated transaction has completed (i.e. the last block of instruction data for that transaction has been received from the BIU 35). Hence, if the transaction has already completed at that time, the associated buffer control state entry is deactivated immediately, but if the transaction is still outstanding the associated buffer control state entry is deactivated as soon as the final block of instruction data is received.

Figure 6:
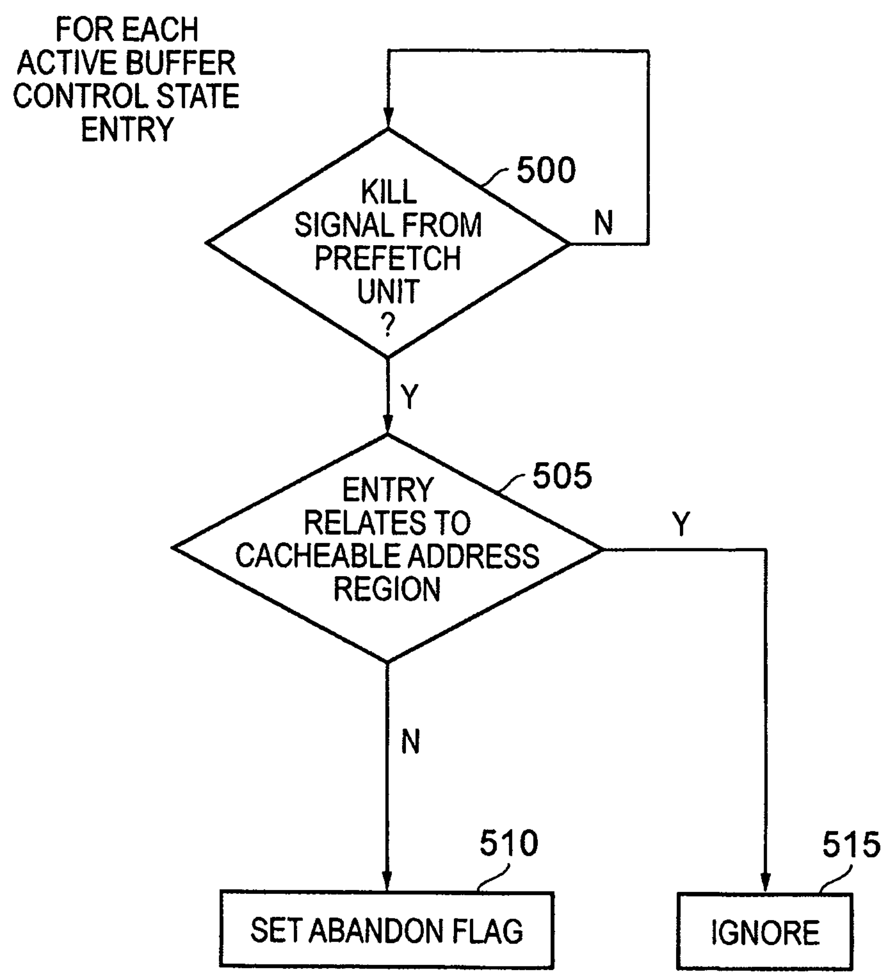
FIG. 6 is a flow diagram illustrating steps taken in respect of each active buffer control state entry upon receipt of a kill signal from the prefetch unit in accordance with one embodiment.

FIG. 6 is a flow diagram illustrating a situation in one embodiment which can give rise to the abandoned flag being set. In particular, at step 500, it is determined whether a kill signal is received from the prefetch unit. A kill signal will be issued by the prefetch unit if it is determined that the sequence of instructions being fetched by the prefetch unit are not going to be executed by the processor core 10. This may for example be the case if the prefetch unit incorrectly predicts the target address for a branch instruction, for example because it predicts that the branch is taken and in fact the branch is not taken, or vice versa, or correctly predicts that the branch is taken, but does not determine the correct target address for the branch instruction. In that instance, the processor core will flush its execution pipelines, and flush all the pending instructions in the instruction queue. Similarly, the prefetch unit will begin prefetching from a determined address.

If at step 500 it is determined that a kill signal has been received from the prefetch unit, then for every active buffer control state entry 120, 125, 130 within the buffer control state circuitry 115, it is determined whether that entry relates to a cacheable address region. If it does, the kill signal is ignored at step 515, whereas if it does not (i.e. it relates to a non-cacheable address region), then the abandon flag is set in the corresponding entry.

As will be apparent from the earlier discussion of FIG. 5A and FIG. 5B, irrespective of whether the abandon flag is set or not, the buffer control state entry remains active until all of the instruction data blocks of the associated transaction have been received and handled. As is clear from step 445 of FIG. 5A, if the abandon flag is set, then any subsequent data blocks received into the buffer are discarded rather than being written into the instruction cache. For transactions relating to non-cacheable address regions, this is a safe course of action, since that instruction data will be of no further use to the processor core, since even if the relevant addresses are encountered during subsequent instruction execution, it will be necessary to retrieve the associated instruction data from memory rather than providing it from a buffered version in the instruction cache. Further, it does not matter if part of a cache line has been written to with some of the blocks of non-cacheable instruction data, since the associated valid flag will not have been set, and accordingly the contents of that cache line will not be visible to a cache lookup process. Further, as is clear from steps 460 and 465 when reached via step 445, once all of the blocks of the transaction have been received, the active flag will be cleared, and accordingly there will be no mechanism to access the partially written instruction data from the instruction cache.

However, for cacheable instructions, in the embodiment illustrated in FIG. 6, it is decided to continue with the remainder of the cache update process, and accordingly every subsequent data block received for that transaction will be written from the buffer into the relevant cache line. As a result, on completion of the transaction, a cache line's worth of cacheable instruction data will have been written into the instruction cache, with the associated valid bit being set. This can be useful, since it is possible that that instruction data will subsequently be requested by the processor core following resumption of normal instruction execution.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:

processing circuitry configured to execute a sequence of instructions, each instruction having an associated memory address and said sequence of instructions including cacheable instructions whose associated memory addresses are within a cacheable memory region;

an instruction cache configured to store cacheable instructions for access by the processing circuitry, said instruction cache having a data storage comprising a plurality of cache lines and a tag storage comprising a plurality of tag entries, each cache line configured to store instruction data specifying a plurality of cacheable instructions, and each tag entry configured to store an address identifier for the instruction data stored in an associated cache line, the instruction cache further comprising valid flag storage configured to identify for each cache line whether that cache line is valid;

instruction cache control circuitry configured to store within a selected cache line of the data storage the instruction data for a plurality of cacheable instructions as retrieved from memory, to store within the tag entry associated with that selected cache line the address identifier for that stored instruction data, and to identify that selected cache line as valid within the valid flag storage;

the instruction cache control circuitry further being configured to receive data of a predetermined data type, said predetermined data type not being instruction data for a plurality of cacheable instructions;

the instruction cache control circuitry being responsive to receipt of said data of a predetermined data type to store said data in a chosen cache line of the data storage of the instruction cache, but to identify the chosen cache line as invalid within the valid flag storage; and the instruction cache control circuitry further comprising control state circuitry configured to maintain a record of the chosen cache line in which said data of a predetermined data type has been written, and upon receipt of a request for that data to provide that data from the instruction cache, wherein said data of a predetermined data type is instruction data for non-cacheable instructions.

2. A data processing apparatus as claimed in claim 1, wherein the instruction cache control circuitry includes a buffer configured to temporarily buffer data received by the instruction cache control circuitry prior to storage of that data in the data storage of the instruction cache.

3. A data processing apparatus as claimed in claim 2, further comprising an interface to memory via which the instruction data is received, the interface having a bus width via which a block of instruction data specifying at least one instruction is received, and said buffer has a size sufficient to accommodate at least one block of instruction data.

4. A data processing apparatus, as claimed in claim 3, where said bus width is less than the width of each cache line within the data storage of the instruction cache.

5. A data processing apparatus as claimed in claim 3, wherein the buffer has a size sufficient to accommodate one block of instruction data.

6. A data processing apparatus as claimed in claim 2, wherein the instruction cache control circuitry is responsive to receipt of a request from the processing circuitry specifying an address for a requested instruction, to determine with reference to the specified address whether the instruction data for the requested instruction is present within the data storage of the instruction cache or within said buffer, and if so to return the instruction data for the requested instruction to the processing circuitry.

7. A data processing apparatus as claimed in claim 6, wherein if the instruction cache control circuitry determines that the instruction data for the requested instruction is not present within the data storage of the instruction cache or within said buffer, the instruction cache control circuitry is configured to initiate a transaction to memory to retrieve from memory a series of blocks of instruction data sufficient to fill a cache line in the data storage of the instruction cache, said series of blocks of instruction data including the instruction data for the instruction requested by the processing circuitry, and each block of instruction data being temporarily buffered in the buffer prior to storage in the data storage of the instruction cache.

8. A data processing apparatus as claimed in claim 7, wherein the control state circuitry comprises a plurality of buffer control state entries, each buffer control state entry having an active flag which when set indicates that that buffer control state entry is active, the control state circuitry being configured to maintain an active buffer control state entry in association with each outstanding transaction where at least one block of instruction data is still awaited from the memory.

9. A data processing apparatus as claimed in claim 8, wherein:

said data of a predetermined data type is instruction data for non-cacheable instructions;

for a transaction relating to instruction data for cacheable instructions, the control state circuitry is configured to clear the active flag of the associated buffer control state entry once all of the blocks of instruction data for that transaction have been stored in the data storage of the instruction cache, the presence of a cleared active flag indicating that the associated buffer control state circuitry is inactive and available for allocation to a subsequent transaction; and for a transaction relating to instruction data for non-cacheable instructions, the control state circuitry is configured to retain the active flag of the associated buffer control state entry in its set state until receipt of a control signal indicating that the associated blocks of instruction data are no longer required, the associated buffer control state entry providing the record of the chosen cache line in which said blocks of instruction data have been written in order to allow those blocks of instruction data to be accessed by the instruction cache control circuitry.

10. A data processing apparatus as claimed in claim 9, wherein the control state circuitry is responsive to a signal indicating that a current request from the processing circuitry for a requested instruction has crossed a cache line boundary with respect to the immediately preceding request from the processing circuitry for a requested instruction, to determine that each active buffer control state entry for a transaction relating to instruction data for non-cacheable instructions is no longer required, and to hence clear the active flag of any such active buffer control state entry once the associated transaction has completed.

11. A data processing apparatus as claimed in claim 9, wherein the control state circuitry is responsive to a signal indicating that a current request from the processing circuitry specifies a non-sequential address with respect to the address specified by the immediately preceding request from the processing circuitry, to determine that each active buffer control state entry for a transaction relating to instruction data for non-cacheable instructions is no longer required, and to hence clear the active flag of any such active buffer control state entry once the associated transaction has completed.

12. A data processing apparatus as claimed in claim 8, wherein each buffer control state entry maintains state data for each block of instruction data of the associated transaction, that state data identifying whether the associated block of instruction data is awaited from memory, is in the buffer, or has been written to the data store of the instruction cache.

13. A data processing apparatus as claimed in claim 8, wherein each buffer control state entry maintains location data identifying a target cache line within the data storage of the instruction cache that is to store the series of blocks of instruction data of the associated transaction.

14. A data processing apparatus as claimed in claim 13, wherein the instruction cache is an n-way set associative cache, and the location data comprises address data identifying a set within the instruction cache and a way identifier identifying the way within that identified set that contains the target cache line.

15. A data processing apparatus as claimed in claim 8, wherein:

the buffer is shared amongst all of the buffer control state entries;

each buffer control state entry maintains a transaction identifier of the associated transaction;

each block of instruction data temporarily buffered in the buffer has its transaction identifier provided in association therewith; and the control state circuitry is configured to use the transaction identifier provided in association with a currently buffered block of instruction data to determine which buffer control state entry should be used to manage how that block of instruction data is stored in the data storage of the instruction cache.

16. A data processing apparatus as claimed in claim 15, wherein the buffer is configured to temporarily buffer a single block of instruction data at a time, with that block of instruction data being stored to the data storage of the instruction cache before a next block of instruction data is input to the buffer.

17. A data processing apparatus as claimed in claim 8, wherein the control state circuitry's maintenance of an active buffer control state entry in association with each outstanding transaction allows the control state circuitry to handle individual blocks of instruction data amongst the series of blocks of instruction data of a single transaction being input to the buffer out of order.

18. A data processing apparatus as claimed in claim 8, wherein the control state circuitry's maintenance of an active buffer control state entry in association with each outstanding transaction allows the control state circuitry to handle individual blocks of instruction data of multiple pending transactions being input to the buffer in an interleaved manner.

19. A data processing apparatus as claimed in claim 8, wherein:

the processing circuitry comprises prefetch circuitry configured to prefetch instructions in anticipation of those instructions being required for execution by the processing circuitry, the prefetch circuitry being configured to issue said request specifying an address for a requested instruction.

20. A data processing apparatus as claimed in claim 19, wherein each buffer control state entry maintains an abandoned flag, and when the abandoned flag is set in one of the buffer control state entries, the instruction cache control circuitry is configured to modify its handling of each subsequent block of instruction data temporarily buffered in the buffer relating to the associated transaction.

21. A data processing apparatus as claimed in claim 20, wherein when the abandoned flag is set in one of the buffer control state entries, the instruction cache control circuitry causes each subsequent block of instruction data temporarily buffered in the buffer relating to the associated transaction to be discarded rather than written into the data storage of the instruction cache.

22. A data processing apparatus as claimed in claim 20, wherein the abandoned flag is set in any active buffer control state entry for a transaction relating to instruction data for non-cacheable instructions, upon receipt of a signal from the processing circuitry indicating that the processing circuitry will not be executing the instructions being prefetched by the prefetch circuitry.

23. A data processing apparatus as claimed in claim 6, wherein on receipt of said request, the instruction cache control circuitry is configured to determine if the requested instruction is a cacheable instruction, and for a cacheable instruction to perform a cache lookup operation in the tag storage, data storage and valid flag storage of the instruction cache to determine if the requested instruction resides within a valid cache line of the instruction cache, any data of said predetermined data type residing in the instruction cache being excluded from the cache lookup operation due to that data residing in one or more cache lines marked as invalid.

24. A method of operating a data processing apparatus having processing circuitry for executing a sequence of instructions, each instruction having an associated memory address and said sequence of instructions including cacheable instructions whose associated memory addresses are within a cacheable memory region, the data processing apparatus further having an instruction cache for storing cacheable instructions for access by the processing circuitry, said instruction cache having a data storage comprising a plurality of cache lines and a tag storage comprising a plurality of tag entries, each cache line storing instruction data specifying a plurality of cacheable instructions, and each tag entry storing an address identifier for the instruction data stored in an associated cache line, the instruction cache further comprising valid flag storage for identifying for each cache line whether that cache line is valid, the method comprising:

storing within a selected cache line of the data storage the instruction data for a plurality of cacheable instructions as retrieved from memory, storing within the tag entry associated with that selected cache line the address identifier for that stored instruction data, and identifying that selected cache line as valid within the valid flag storage;

receiving data of a predetermined data type, said predetermined data type not being instruction data for a plurality of cacheable instructions;

in response to receipt of said data of a predetermined data type, storing said data in a chosen cache line of the data storage of the instruction cache, but identifying the chosen cache line as invalid within the valid flag storage; and maintaining a record of the chosen cache line in which said data of a predetermined data type has been written, and upon receipt of a request for that data, providing that data from the instruction cache, wherein said data of a predetermined data type is instruction data for non-cacheable instructions.

25. A data processing apparatus comprising:

processing means for executing a sequence of instructions, each instruction having an associated memory address and said sequence of instructions including cacheable instructions whose associated memory addresses are within a cacheable memory region;

an instruction cache means for storing cacheable instructions for access by the processing means, said instruction cache means having a data storage means comprising a plurality of cache lines and a tag storage means comprising a plurality of tag entries, each cache line for storing instruction data specifying a plurality of cacheable instructions, and each tag entry for storing an address identifier for the instruction data stored in an associated cache line, the instruction cache means further comprising valid flag storage means for identifying for each cache line whether that cache line is valid;

instruction cache control means for storing within a selected cache line of the data storage means the instruction data for a plurality of cacheable instructions as retrieved from memory means, for storing within the tag entry associated with that selected cache line the address identifier for that stored instruction data, and for identifying that selected cache line as valid within the valid flag storage means;

the instruction cache control means further for receiving data of a predetermined data type, said predetermined data type not being instruction data for a plurality of cacheable instructions;

the instruction cache control means, responsive to receipt of said data of a predetermined data type, for storing said data in a chosen cache line of the data storage means of the instruction cache means, but for identifying the chosen cache line as invalid within the valid flag storage means; and the instruction cache control means further comprising control state means for maintaining a record of the chosen cache line in which said data of a predetermined data type has been written and, upon receipt of a request for that data, for providing that data from the instruction cache means, wherein said data of a predetermined data type is instruction data for non-cacheable instructions.

* * * * *